(12) United States Patent
Babonneau et al.

(10) Patent No.: US 7,548,277 B2
(45) Date of Patent: *Jun. 16, 2009

(54) DEVICE AND METHOD FOR ESTIMATING THE NOISE OF A VIDEO SIGNAL

(75) Inventors: Jean-Yves Babonneau, L'Hermitage (FR); Jacky Dieumegard, Rennes (FR); Olivier Le Meur, Talensac (FR)

(73) Assignee: Thomson Licensing, Boulogne-Billancourt (FR)

( * ) Notice: Subject to any disclaimer, the term of this patent is extended or adjusted under 35 U.S.C. 154(b) by 841 days.

This patent is subject to a terminal disclaimer.

(21) Appl. No.: 10/964,088

(22) Filed: Oct. 13, 2004

(65) Prior Publication Data
US 2005/0128356 A1    Jun. 16, 2005

(30) Foreign Application Priority Data
Oct. 14, 2003   (FR) .................................. 03 12007

(51) Int. Cl.
*H04N 5/217* (2006.01)
(52) U.S. Cl. .................... 348/607; 348/620; 348/701
(58) Field of Classification Search ................. 348/607, 348/620–621, 624, 616–617, 700–701; 382/275, 382/260–261, 263–264; 708/300, 320; 375/240.01, 375/240.12, 240.29, 240.26, 240.16, 240.21; *H04N 5/217*
See application file for complete search history.

(56) References Cited

U.S. PATENT DOCUMENTS

| 5,185,664 | A | | 2/1993 | Darby |
| 5,568,196 | A | | 10/1996 | Hamada et al. |
| 5,880,791 | A | * | 3/1999 | De Haan et al. ............. 348/607 |
| 5,903,680 | A | * | 5/1999 | De Haan et al. ............. 382/265 |
| 5,978,033 | A | | 11/1999 | Ohnishi |
| 7,268,835 | B2 | * | 9/2007 | Babonneau et al. ......... 348/607 |
| 2002/0101543 | A1 | * | 8/2002 | Ojo et al. .................... 348/607 |

FOREIGN PATENT DOCUMENTS

EP    1 096 791 A2    10/2000

OTHER PUBLICATIONS

Search Report.

\* cited by examiner

*Primary Examiner*—Trang U Tran
(74) *Attorney, Agent, or Firm*—Robert D. Shedd; Paul P. Kiel; Guy H. Eriksen

(57) ABSTRACT

The disclosure relates to a device and a method for estimating the noise level of a video signal representing image sequences. The device comprises a movement compensated interpolation means, a recursive filter designed to receive on a first input the output of the recursive filter movement compensated by the movement compensated interpolation means and on a second input the video signal, means of calculating the difference between the video signal and the output of the recursive filter movement compensated by the movement compensated interpolation means. In accordance with the principles of the invention, the device comprises means of estimating the noise level of the video signal according to the difference and a maximum threshold delimiting this difference.

7 Claims, 2 Drawing Sheets

DEVICE AND METHOD FOR ESTIMATING THE NOISE OF A VIDEO SIGNAL

This application claims the benefit, under 35 U.S.C. 119, of French patent application No. 0312007 filed Oct. 14, 2003.

The present invention relates to a device and a method for estimating the noise level of a video signal, and a noise reduction system and an encoding system including such a device.

BACKGROUND OF THE INVENTION

Noise reduction is an important factor in pre-encoding video preprocessing. It is based on recursive time domain filtering, for which the recursion rate is adjusted according to the noise level present in the sequence of images to be processed.

Estimation of the noise level is therefore important for obtaining a filtering system which adapts automatically to the sequence of incoming images.

In known methods, in the total absence of movement and because of its time-random nature, the noise can be detected by establishing the pixel-by-pixel difference between two consecutive images. The average of the differences in an image then constitutes a representation of the noise level.

When there is movement, the noise level can be estimated by calculating the difference between the current image and the preceding image reconstructed to match the current image using the vector fields supplied by the movement estimator.

However, such methods present numerous drawbacks:
the movement vector can produce estimation errors, provoking a poor reconstruction of the image and therefore an overestimation of the noise level, since there is movement in the image sequence,
the movement vector and therefore the differences between images (Displaced Frame Difference DFD), are inconsistent all around the perimeter of the image, which also falsifies the estimation of the noise level,
the estimation of the noise level is based on the random nature of the noise, which is not always reliable.

BRIEF SUMMARY OF THE INVENTION

The present invention relates to a robust noise estimating device using the pixel-by-pixel difference between the source image and the filtered image, delayed by one image and movement compensated in order to obtain a good estimation of the noise, by considerably reducing the negative effects explained above.

To this end, the invention proposes a device for estimating the noise level of a video signal representing image sequences comprising
movement-compensated interpolation means,
a recursive filter designed to receive on a first input the output of the recursive filter movement compensated by the movement compensated interpolation means and on a second input the video signal,
means of calculating the difference between the video signal and the output of the recursive filter movement compensated by the interpolation means.

According to the invention, the device comprises means of estimating the noise level of the video signal according to said difference and a maximum threshold delimiting this difference.

This device can make the estimation of the noise level in a video sequence robust and improve the performance of a noise reducer to which it would be linked.

Preferably, the means of estimating the noise level comprise means of comparing, for each pixel of an image in the video signal, the difference between said pixel value and said pixel value after movement compensated recursive filtering, at said threshold (Sc).

This can allow for a better estimation of noise level for each pixel and so avoid an overall estimation which would generate blurring effects on the frame.

Advantageously, the device comprises
means of defining for each image a working window composed of a number of pixels centred on the image,
means of accumulating, for each pixel in the working window for which the difference between its value and its value after movement compensated recursive filtering is less than said threshold, said difference,
means of calculating an average noise level ($\sigma_{avg}$) by dividing the differences accumulated previously by the number of accumulated differences.

Such a working window allows for a better estimation of the noise level by achieving independence from potential movement vector computation errors around the edges of the image.

According to a preferred embodiment, the device comprises:
means of measuring the inter-image and intra-frame correlations of each image,
means of calculating an overall noise level for each frame according to the average noise level and the inter-image and intra-frame correlations,
means of calculating a local noise level for each pixel of said frame according to the overall noise level of said frame and the luminance of said pixel.

Advantageously, said threshold is linked to filtering parameters of said recursive filter.

The invention also relates to a method for estimating the noise level of a video signal representing image sequences comprising the following steps:
movement compensated interpolation,
recursive filtering designed to receive on a first input of a recursive filter the output of said recursive filter movement compensated by the interpolation means and on a second input of the recursive filter the video signal,
calculation of the difference between the video signal and the output of the recursive filter movement compensated by the interpolation means.

According to the invention, the method comprises a step for estimating the noise level of the video signal according to said difference and a maximum threshold delimiting this difference.

BRIEF DESCRIPTION OF THE DRAWINGS

The invention will be better understood and illustrated using examples of advantageous embodiments and implementations, by no means limiting, with reference to the figures appended, in which.

DETAILED DESCRIPTION OF THE INVENTION

Figure 1:
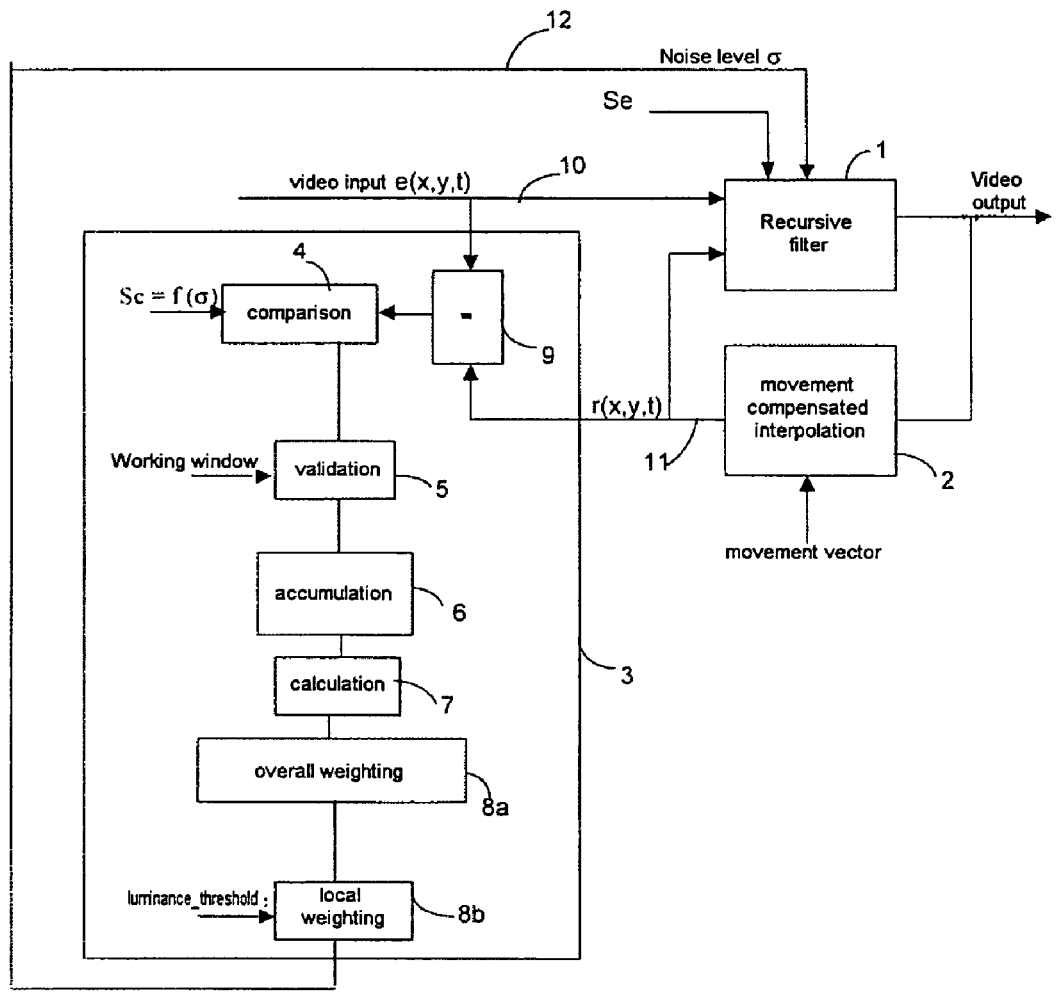
FIG. 1 represents a noise reduction device coupled to a noise estimation device according to an embodiment of the invention.
Figure 2:
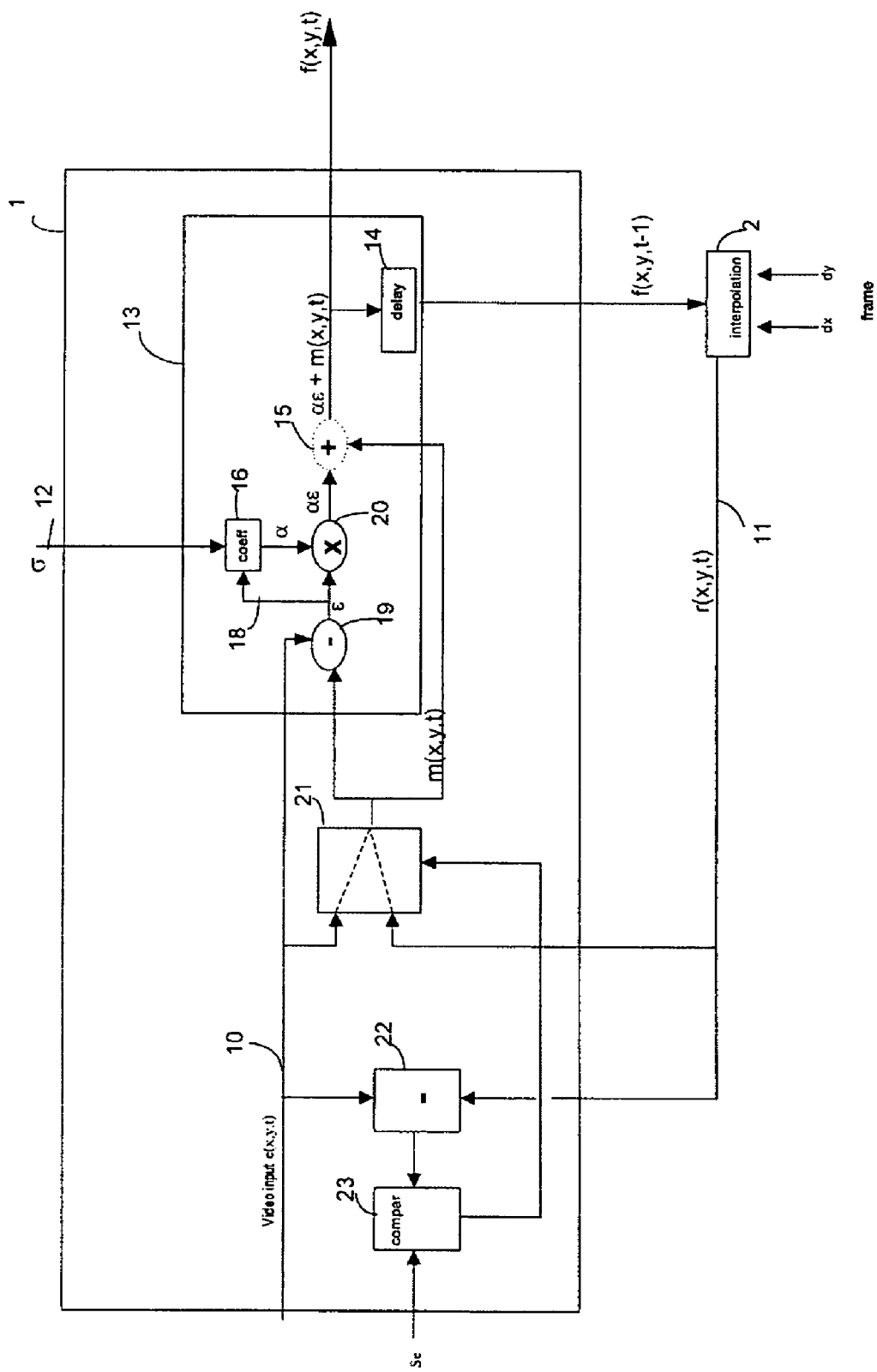
FIG. 2 represents an embodiment of a recursive filter such as can be used in the noise reduction device.

A noise estimation device as shown in FIG. 1 can be used to obtain a robust estimation of the noise on a video sequence 10 e(x,y,t). A good estimation of the noise can be used to improve considerably the performance of a noise reducer. To this end, the noise reducer comprises a recursive filter 1. An example of an efficient recursive filter that can be used is illustrated in FIG. 2.

To obtain efficient operation, the noise reduction methods involving a recursive filter consider the very strong time correlation of the images of a video sequence. Consequently, the concepts of movement and displacement are important for perfecting an effective noise reduction. This is why the recursive filter 1 is coupled to movement compensated interpolation means 2.

The device 3 for estimating the noise level of the incoming video sequence 10 supplies the estimated noise level 11 designated σ to the recursive filter 1.

The noise estimation device 3 comprises comparison means 4 receiving as input a threshold Sc which can be linked to the filtering severity of the recursive filter 1.

For example, if it is assumed that there is a five-position filtering adjustment cursor (cursor_position), Sc can be assigned the following value:

Sc=16+cursor_position, 16 being an arbitrarily set value.

The comparison means 4 also receive as input the output of a differentiator 9. The differentiator 9 calculates the difference between the incoming video signal 10 and the movement compensated filtered output 11 r(x,y,t).

The differentiator 9 calculates a pixel-by-pixel difference between the two signals.

The comparison means 4 compare the difference received from the differentiator 9 with a threshold value Sc.

If $\epsilon = e(x,y,t) - r(x,y,t) < Sc$ then the comparison means 4 transmit $\epsilon$ to validating means 5.

Otherwise, if $\epsilon = e(x,y,t) - r(x,y,t) \geq Sc$ then the comparison means 4 transmit the value "0" to the validating means 5.

The comparison means 4 can thus be used to eliminate the significant value errors that are unrelated to the noise to be eliminated.

The validating means are used to work only on a window of the image to improve the robustness of the device. Since the video signal represents an image, the movement vectors often present imperfections on the pixels located at the edge of the image. It is therefore advantageous to work on a window of the image located in the middle of the image so that the pixels located around the edges can be disregarded.

An accumulation module 6 accumulates all the differences retained by the validating module 5.

A module 7 calculates an average noise level $\sigma_{avg}$ estimated firstly by dividing the sum of the differences accumulated by the module 6 by the number of accumulated differences. The result gives Avgdif:

$$Avgdif = \frac{\sum accumulateddifferences}{numberofaccumulateddifferences}$$

Then, this first noise level obtained is adapted to the target application and is made dependent on the filtering severity.

$$\sigma_{avg} = \frac{avgdif^2 \times cursor\_position}{avgdif + cursor\_position}$$

It can then be seen that the more the cursor value increases, the more the estimated noise level increases and the more severe the recursive filter becomes.

Advantageously, in this embodiment $\sigma_{avg}$ is limited between 0.5 and 15.5.

The value of $\sigma_{avg}$ changes according to the frames, but the variation from one frame to the next is limited to +0.5 or minus 2. It is therefore possible to reduce the value of $\sigma_{avg}$ rapidly but it is more difficult to increase it rapidly to avoid an oscillation effect.

The module 7 therefore produces at the output an estimated noise level transmitted to an overall weighting module 8a.

To correct the average noise level $\sigma_{avg}$ produced by the module 7, the latter is weighted by the module 8a which then generates an overall noise level $\sigma_{glob}$. This is particularly advantageous for video signals with strong movement and/or high definition.

The module 8a provides an overall weighting at image level.

The inter-image correlation (corr$_{inter}$) is equal to the sum of all the pixel-by-pixel differences between the current frame T and the preceding frame T-2, divided by the number of pixels in the frame.

The intra-frame correlation (corr$_{intra}$) is equal to the sum of all the pixel-by-pixel differences between the current line of the frame and the preceding line of the frame divided by the number of pixels in the frame.

Therefore $\sigma_{avg}$ is weighted according to the inter-image and intra-image correlations measured on the image sequence currently being processed by the noise reduction device 1 according to the following formula:

$$\sigma_{glob} = \frac{\sigma_{avg}}{K}$$

The coefficient K can be calculated, by way of illustration, in the following way:

$$corr = \frac{corr_{intra} + corr_{inter}}{2}$$

If the value of Corr is located between two thresholds S1 and S2, then K varies linearly between the values "1" and "2".

The thresholds S1 and S2 are chosen relative to two typical video sequences:

Firstly, a simple video sequence without significant movement and with low definition: the value of "Corr" calculated on this sequence gives the value of S1.

Secondly, a complex video sequence with strong movement and high definition: the value of "Corr" calculated on this sequence gives the value of S2.

Consider the following illustration:

if Corr<S1, then K=1;

if Corr>S2, then K=2

Which gives:

for a simple sequence: $\sigma_{glob} = \sigma_{avg}$.

for a complex sequence $\sigma_{glob} = \sigma_{avg/2}$.

for a video sequence located between these two extremes, $\sigma_{glob} = \sigma_{glob}$ weighted by the value of "corr".

The local weighting module 8b receives as input $\sigma_{glob}$ and a luminance threshold, luminance_threshold, to establish a local weighting for each pixel. In practice, by exploiting a property of the human visual system concerning the low sensitivity of the eye to degradations in low luminance areas, it is advantageous to establish a weighting of the noise level locally at the level of each pixel.

If the luminance value of the current pixel is less than a threshold, luminance_threshold, the estimated noise level associated with this pixel is raised to a higher value.

By way of illustration, the noise level estimated on the frame $\sigma_{glob}$ can, for example, be weighted locally for each pixel by 1.25 to obtain the local noise level a of said pixel.

FIG. 2 represents an exemplary recursive filter which can be used in the noise reduction device as described in FIG. 1.

A noise reducing filter 1 as represented in FIG. 2 can be used to correct the imperfections linked to the movement compensation in a movement compensated recursive filtering device.

Such a device can be used to separate the errors due to the movement compensation and the real noise.

The device 1 comprises a recursive filtering module 13 and a multiplexer 21.

The noise contained in certain video sequences can reduce the effectiveness of a video encoder, of MPEG type for example, resulting in poor viewing quality despite a reasonable encoding rate.

The recursive filter 13 preferably has a granularity of the order of the pixel.

The video signal 10 is representative of an image and is composed of a certain number of pixels. Each image is encoded in interlaced mode and is composed of two frames. Each pixel of the image is filtered by the device 13.

The video signal 10 is received on an input of the subtractor 19. The subtractor 19 receives on its second input the output of the multiplexer 21, m(x,y,t).

The recursive filter 13 receives at the input an estimation of the frame noise level 12 sigma ($\sigma$) of the frame established by a noise estimator as represented in FIG. 1.

The noise level ($\sigma$) is used to calculate a recursion coefficient $\alpha$.

The recursion coefficient $\alpha$ weights the effectiveness of the filtering according to the noise level $\sigma$ in the frame and the error 18 calculated between the video signal e(x,y,t) at the input and the output m(x,y,t) of the multiplexer 21, or the output of the differentiator 19.

$$\alpha = \frac{\varepsilon}{4 \times \sigma} \text{ and } \alpha \in [0.25; 1]$$

The coefficient $\alpha$ is transmitted to the multiplier 20.

The following is therefore obtained at the output of the multiplier 20:

$$\alpha \times \varepsilon = \alpha(e(x,y,t) - m(x,y,t))$$

At the output of the adder 15, f(x,y,t) is obtained, where:

$$f(x,y,t) = \alpha \times e(x,y,t) + (1-\alpha) \times m(x,y,t)$$

The signal f(x,y,t) is then transmitted to the movement compensated interpolation means 2 after having undergone a delay of one frame f(x,y,t−1). The interpolation means 2 generate from f(x,y,t−1) and from the displacement vector (dx,dy) of the current frame, the movement compensated output r(x,y,t).

The movement compensated output r(x,y,t) is then transmitted to a differentiator 22. The differentiator 22 also receives as input the video signal e(x,y,t). The differentiator 22 produces the signal g(x,y,t) as output:

$$g(x,y,t) = e(x,y,t) - r(x,y,t)$$

The comparator 23 represented in FIG. 1 receives as input g(x,y,t) and a noise level threshold Se.

The threshold Se depends on the final application to which the noise reduction device according to the invention can be linked. It represents a compromise between the effectiveness of the noise reducer and the appearance of artefacts in the noise reducing filter output.

In a first embodiment, the threshold Se can be linked linearly to a filtering severity degree.

For example, if it is assumed that there is a five-position filtering adjustment cursor (cursor-position), the following value can be assigned to Se:

Se=16+cursor_position, 16 being a value set arbitrarily.

In a second embodiment, Se can be adapted to the noise level $\sigma$ and so vary it for each frame.

According to a third embodiment, the threshold can be modified dynamically and locally and adapted to characteristic areas of the image being processed. Thus, for the movement areas, the risk of artefacts increases and it is preferable to lower the value of the threshold Se. For the low movement areas, the threshold value can be higher.

The multiplexer 21 directs towards an input of the recursive filter the video signal e(x,y,t) or the movement compensated output r(x,y,t) depending on the threshold Se.

The multiplexer can be used to sort between the real noise and the compensation errors.

The comparator 23 generates a control signal to the multiplexer 21.

If g(x,y,t)>Se, then the control signal sent to the multiplexer 21 tells the multiplexer 21 to send the video signal e(x,y,t) to the recursive filter 13.

If g(x,y,t)<Se, then the control signal sent to the multiplexer 21 tells the multiplexer 21 to send the movement compensated output r(x,y,t) to the recursive filter 13.

The invention claimed is:

1. Device for estimating a noise level of a video signal representing image sequences comprising
    movement compensated interpolation means generating a movement compensated output signal,
    a recursive filter designed to receive on a first input the movement compensated output signal and on a second input the video signal, said recursive filter generating a video output signal, the video output signal being compensated by the movement compensated interpolation means to produce the movement compensated output signal,
    means of calculating a difference between the video signal and the movement compensated output signal,
    means of estimating the noise level of the video signal according to the calculated difference and a maximum threshold delimiting the calculated difference, wherein the means of estimating includes:
        a comparator for comparing each calculated difference to the maximum threshold; and
        an accumulator for accumulating the calculated differences that are less than the maximum threshold to produce an accumulated sum of differences used to estimate the noise level of the video signal according to the calculated difference and the maximum threshold.

2. Device according to claim 1 wherein said comparator further includes means of comparing, for each pixel of an image in the video signal, the difference between said pixel value and said pixel value after movement compensated recursive filtering, at said maximum threshold.

3. Device according to claim 1 further comprising:
    means of defining for each image a working window composed of a number of pixels centered on the image, and wherein the means of calculating the difference being calculated for each pixel in the working window as the difference between the pixel value and the pixel value after movement compensated recursive filtering, and the means of estimating further includes circuitry for calculating an average noise level by dividing the accumulated sum of differences by a number of accumulated differences.

4. Device according to claim 3 wherein the means of estimating the noise level of the video signal further includes:

means of measuring the inter-image and intra-frame correlations of each image, means of calculating an overall noise level for each frame according to the average noise level and the inter-image and intra-frame correlations, means of calculating a local noise level for each pixel of said frame according to the overall noise level of said frame and the luminance of said pixel.

5. Device according to claim 1 wherein said maximum threshold is linked to filtering parameters of said recursive filter.

6. Method for estimating a noise level of a video signal representing image sequences comprising the following steps:

movement compensated interpolation generating a movement compensated output signal, receiving on a first input of a recursive filter the movement compensated output signal and on a second input of the recursive filter the video signal, generating a video output signal, the video output signal being compensated by the movement compensated interpolation to produce the movement compensated output signal, calculation of a difference between the video signal and the movement compensated output signal, and estimating the noise level of the video signal according to the calculated difference and a maximum threshold delimiting the calculated difference, wherein the step of estimating includes:

comparing each calculated difference to the maximum threshold; and accumulating the calculated differences that are less than the maximum threshold to estimate the noise level of the video signal according to the calculated differences and the maximum threshold.

7. Device for reducing the noise of a video signal comprising a noise level estimation device according to claim 1.

* * * * *